Figure 1:
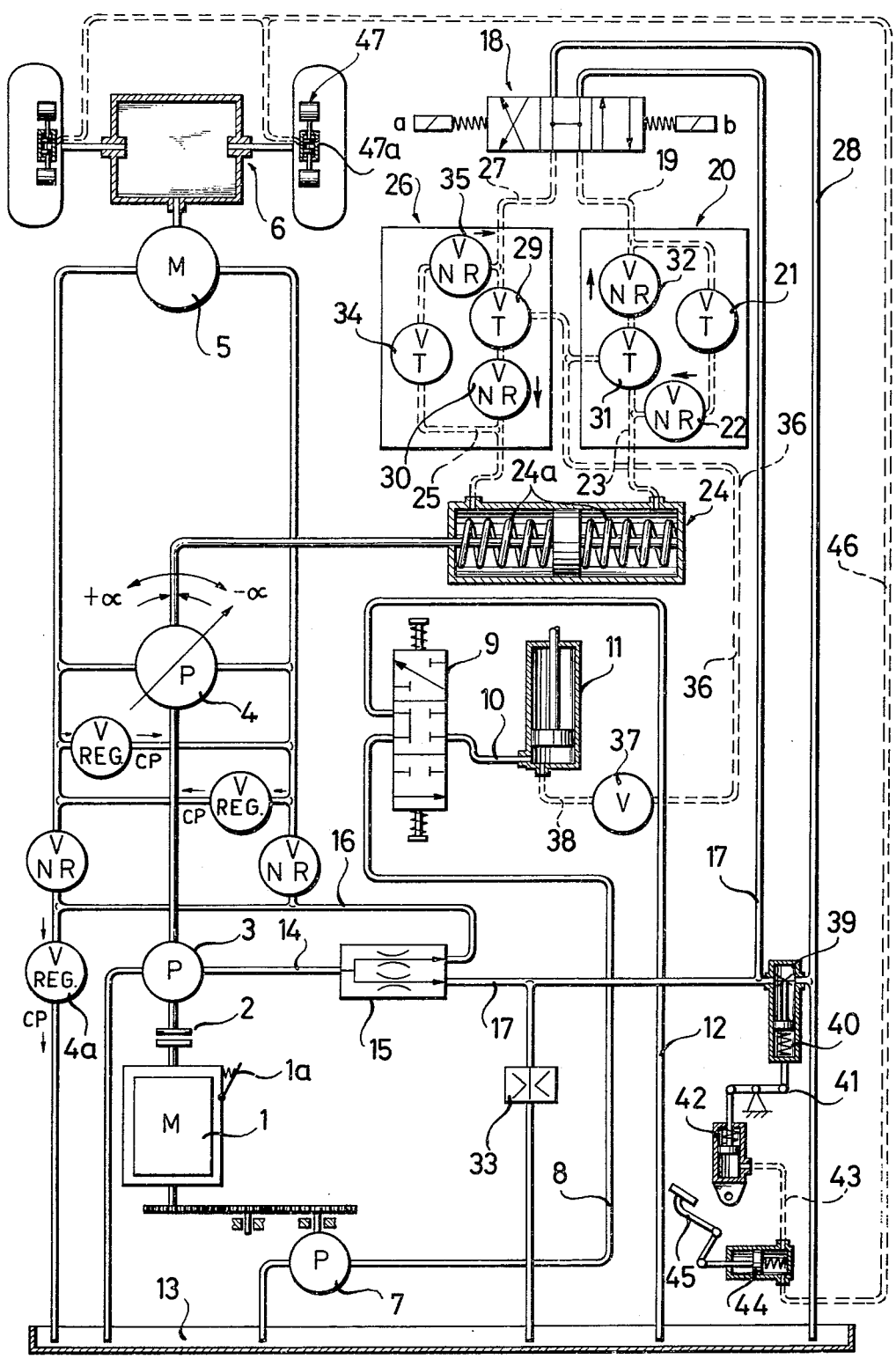

United States Patent [19]

Hachmann

[11] 4,050,248
[45] Sept. 27, 1977

[54] CONTROL DEVICE FOR HYDROSTATIC DRIVE, ESPECIALLY FOR FORK LIFT TRUCK

[75] Inventor: Friedrich Hachmann, Dortmund, Germany

[73] Assignee: O & K Orenstein & Koppel Aktiengesellschaft, Dortmund, Germany

[21] Appl. No.: 721,758

[22] Filed: Sept. 9, 1976

[30] Foreign Application Priority Data

Sept. 17, 1975 Germany .............................. 2541398

[51] Int. Cl.² ...................... F16H 39/46; F15B 11/16
[52] U.S. Cl. ........................................ 60/445; 60/462; 60/484; 60/486
[58] Field of Search ................. 60/445, 459, 462, 465, 60/484, 486, 494

[56] References Cited

U.S. PATENT DOCUMENTS 3,543,508  12/1970  Schwab .............................. 60/445 X
3,850,272  11/1974  Reinecke et al. .................. 60/445 X

FOREIGN PATENT DOCUMENTS 1,279,693  6/1972  United Kingdom ................... 60/445

Primary Examiner—Edgar W. Geoghegan
Attorney, Agent, or Firm—Walter Becker

[57] ABSTRACT

A control device for a hydrostatic drive, especially for a fork lift truck, in which an engine drives a reversible variable delivery pump which supplies fluid to a fluid motor connected to the drive wheels of the lift truck. A reversible actuator is connected to a control element for the pump and is connected through a reversing valve with a further engine driven pump. The rate of movement of the actuator is controlled in the opposite directions of movement thereof. The truck includes a lift cylinder supplied by a still further engine driven pump, and when the lift cylinder is under pressure, the rate of movement of the actuator is controlled at a still slower speed of movement in at least one direction of movement.

9 Claims, 2 Drawing Figures

CONTROL DEVICE FOR HYDROSTATIC DRIVE, ESPECIALLY FOR FORK LIFT TRUCK

The present invention relates to a control device for a hydrostatic reversible drive which is provided with a braking device, especially for fork lifts. More specifically, the invention consists of a drive of the above mentioned type which comprises a hydraulic main circuit with an adjustable axial pump shiftable in both directions, with one or more hydraulic motors and a control circuit with a hydraulic pump which rotates together with the drive motor and acts upon the control circuit, and with a drive direction valve. The control circuit acts through the invtervention of throttling devices which include control valves upon the adjusting device of the axial pump. The device furthermore comprises an additional hydraulic circuit which through the intervention of an additional hydraulic pump and a control valve acts upon a lifting cylinder-piston-system actuating the load receiving means.

With a heretofore known control device, a control pump arranged on the pump shaft of the pump driven by a drive motor for the entire system feeds against an orifice of constant cross section. The damming-up pressure which occurs and increases with increasing speed of the drive motor is used for shifting the hydrostatic pump. The shifting speed is determined by two throttling devices in the control conduits to the adjusting device in both directions of operation and having constant cross sections. This constant adjustment is effective in both adjusting devices which means for accelerating and for braking nearly the same forces are exerted upon the vehicle when the adjusting pump is shifted. The braking effect exerted by the hydrostatic system is determined by the control and automatic return of the adjusting pump to its central position in which it does not convey any fluid. Therefore, with this heretofore known device it is necessary that the constant adjustment of the throttling device is tuned to the relatively unfavorable dynamic driving stability of the loaded fork lift. For braking when driving forwardly and for accelerating when driving rearwardly, the shifting speed is determined by the constant throttling devices. As a result thereof, it is impossible at a corresponding shifting speed of the pump to realize an advantageous and desirable high acceleration for the forward drive and an as high as possible retardation during the rearward drive.

It is, therefore, an object of the present invention to provide a control device of the above mentioned general character which will overcome the drawbacks of heretofore known control devices under consideration abnd will make possible an optimum retardation during the forward drive and an optimum acceleration during the rearward drive without increasing the dimensions of the fork lift and without increasing the weight of the fork lift for obtaining a satisfactory dynamic driving stability.

This object and other objects and advantages of the invention will appear more clearly from the following specification in connection with the accompanying drawings, in which:

FIG. 1 diagrammatically illustrates the hydrostatic driving arrangement according to the invention with double adjustable throttles.

Figure 2:
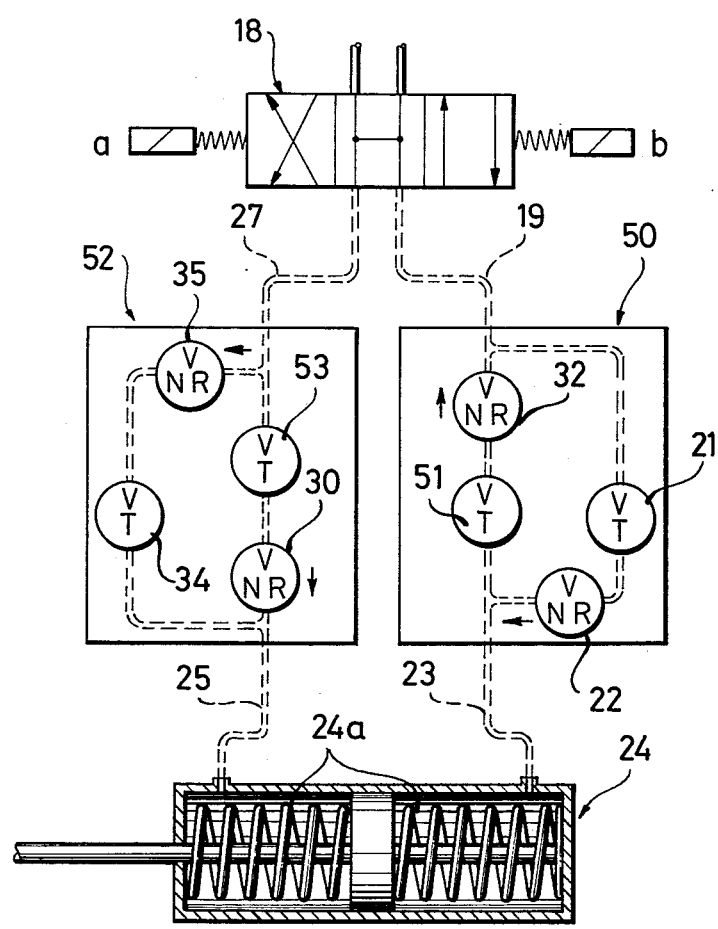

FIG. 2 is a diagrammatic illustration of the adjusting device with driving direction valves of the hydrostatic driving arrangement in conformity with the invention and with four constant throttles.

The control device according to the invention is characterized primarily in that between the driving direction valves and the adjusting device two double throttle valves are arranged while the double throttle valve for starting and braking during forward drive comprises a throttle having constant cross section, a check valve arranged between the driving direction valve and an adjustable throttle, and a check valve located between the direction adjusting device and the constant throttle, whereas the double throttle valve for controlling the starting and braking during rearward drive is provided with an adjustable throttle, a throttle having constant cross section, a check valve located between the driving direction valve and the constant throttle, and is furthermore provided with a check valve arranged between the adjusting device and the adjustable throttle, the adjustment of the adjustable throttles being effected through the intervention of a control conduit having a damping valve in a load-dependent manner from the effective pressure in the lifting cylinder-piston-system.

According to another embodiment of the invention, with each of the two double throttling devices, instead of the adjustable throttles there are employed throttles having constant cross section which have a cross-sectional relationship to the two other constant throttles in conformity with a dynamic driving stability. Such an arrangement yields a device which is considerably less expensive than the other embodiment of the invention although it is not quite as flexible as the first mentioned embodiment of the invention.

Referring now to the drawings in detail, the arrangement shown therein comprises a driving motor 1 which through the intervention of a clutch 2 drives the hydraulic pump 3 which furnishes the control flow for the adjustment of the axial piston pump 4. The axial piston pump 4 drives the hydraulic motor 5 which drives the front axle 6 of the fork lift not illustrated in the drawings. The drive motor 1 furthermore drives the hydraulic pump 7 which conveys oil under pressure through the conduit 8, the control valve 9, and the conduit 10 to the lifting cylinder 11. The oil displaced by the lifting cylinder piston system 11, when lowering the fork lift, and the oil conveyed by the hydraulic pump 7 flows through the conduit 12 into the tank 13. The oil flow conveyed by the hydraulic pump 3 is conveyed through the conduit 14 to the flow divider 15 from which the oil flow, on one hand, passes through conduit 16 to the axial piston pump 4 as feeding flow which by means of the pressure limiting valve 4a is held constant, and, on the other hand, control fluid flow passes through conduit 17 to the driving direction valve 18 and from there with valve 18 in the position $a$ through the conduit 19 to the double throttle valve 20. In the double throttle valve 20, the oil passes through the throttle 21 of constant cross section and then through the check valve 22 and the conduit 23 to the adjusting device 24 which adjusts the axial piston pump 4 in the direction $+\beta$ (forward drive). The oil which during this adjustment is displaced from the adjusting device 24 passes through the conduit 25 and the double throttle valve 26, the conduit 27, the driving direction valve 18, and the conduit 28 into the tank 13. When the driving direction valve 18 has moved into the position $b$, the oil passes through the conduit 27, the adjustable throttle 29, and the check valve 30 of the double throttle valve 26 and conduit 25 to the adjusting device 24 which adjusts the axial piston pump 4 in the direction −α (rearward drive). The oil which is displaced during this adjustment from the adjusting device 24 passes through the conduit 23, the double throttle valve 20, the conduit 19, the driving direction valve 18, and the conduit 28 into the tank 13.

As soon as the return force of the adjustable axial piston pump 4 and the thrust of the springs 24a exceeds the control pressure in the conduit 17, a return of the adjusting device 24 is effected. The oil displaced as a result thereof flows during the return of the axial piston pump 4 from +α through the conduit 23 to the adjustable throttle 31, the check valve 32, the conduit 19, the driving direction valve 18, and the conduit 17 through the orifice 33 to the tank 13.

The oil displaced during the return of the axial piston pump 4 from −α flows through the conduit 25, the throttle 34 of constant cross section, the check valve 35, the conduit 27, the driving direction valve 18, and the conduit 17 through the orifice 33 to the tank 13. The adjustable throttles 29 and 31 are adjusted through the control conduit 36, the damping valve 37 and conduit 38 by means of the pressure prevailing in the lifting cylinder-piston-system 11. The inch device with adjustable orifice 39 which is normally held in closed condition by means of a spring 40 is connected to the main brake cylinder 44 through the intervention of the linkage 41, receiver cylinder 42 and control conduit 43. The main brake cylinder 44 is actuated by means of a brake pedal 45. In view of the adjusting orifice 39 being adjusted by actuation of the brake pedal 45, the control pressure in conduit 17 is reduced toward the conduit 28. The wheel brake cylinders 47 and 47a of the operational brake are through conduit 46 connected to the main brake cylinder-piston-system 44.

According to a further development of the present invention as illustrated in FIG. 2, two throttles each of constant cross section are arranged in the two double throttle valves 50 and 52. The double throttle valve 50 which serves for controlling the forward drive comprises the throttle 21 of constant cross section, the throttle 21 having associated therewith the additional throttle 51 of constant cross section. The cross section of throttle 21 is dimensioned in conformity with the optimum acceleration, and the cross section of the throttle 51 is dimensioned in conformity with the retardation at maximum load on the vehicle while taking into consideration the then prevailing reduced driving stability. The double throttle valve 52 which serves for controlling the rearward drive comprises the throttle 34 of constant cross section, the throttle 34 having associated therewith the further throttle 53 of constant cross section. The cross section of throttle 34 is dimensioned in conformity with the optimum brake retardation, and the cross section of throttle 53 is dimensioned in conformity with the dynamic driving behavior — under the influence of the maximum load — during the acceleration.

The operation of the arrangement is as follows:

When the drive motor has been started and the gas pedal 1a has been actuated while the driving direction valve 18 occupies its position a, the oil under pressure delivered by the hydraulic pump 3 flows through the conduit 14 to the flow divider 15 and from there through the conduit 17 to the driving direction valve 18 and the conduit 19 to the throttle 21 of constant cross section and from there passes through the conduit 23 to the adjusting device 24 which adjusts the axial piston pump 4 in the direction +α, which means in the direction of an optimum acceleration in a forward direction of vehicle movement. The oil which has been displaced from the non-acted upon chamber passes, as described above, through the throttle 34 to the tank 13. The acceleration in forward drive is independent of the load acting on the vehicle, i.e. independent of the pressure prevailing in the lifting cylinder 11, because in the above mentioned circuit the oil flows only through the throttles of full constant cross section. For purposes of retarding the forward drive of the loaded fork lift, either pressure on the gas pedal 1a is relieved so that the speed of the driving motor 1 and thus the delivery of the hydraulic pump 3 decreases, or the driving direction valve 18 is shifted to its intermediate position. In both instances the control pressure in the adjusting device 24 drops. In the double throttle valve 20, by means of the check valve 22, the throttle 21 of constant cross section is shut off from exhaust frame 24 and the hydraulic oil which flows back from the adjusting device 24 is conveyed to the throttle 31 having adjustable cross section. At the same time, through the control conduit 38, 36 communicating with the lifting cylinder 11, the load-dependent pressure prevailing in the conduit 38, 36 is conveyed to the throttle 31 having adjustable cross section. Thus, the permissible retardation of the loaded fork lift is automatically in conformity with the load adapted to the dynamic driving stability.

When the gas pedal 1a is actuated for rearward drive while the driving direction valve 18 is in its position b, the oil flow delivered by the hydraulic pump 3 is conveyed to the double throttle valve 26 through the conduit 17. At the same time the load-dependent pressure prevailing in the lifting cylinder 11 is through the conduit 38, 36 conveyed to the throttle 29 having adjustable cross section. As a result thereof, the adjusting device 24 adjusts the axial piston pump 4 in a direction in the sense of a load-dependent acceleration in the direction −α. The shifting speed of the axial piston pump 4 is thus automatically adapted to the critical driving condition of the loaded fork lift which starts to drive rearwardly. For purposes of braking, in other words when shifting back the axial piston pump 4, toward zero displacement position, the throttle 29 of adjustable cross section is shut off by the check valve 30 so that a maximum braking of the rearwardly driving fork lift will be realized with a corresponding shifting speed of the axial piston pump 4 in the direction toward its intermediate position. In the opposite direction, in other words for starting to drive rearwardly, the check valve 35 blocks the throttle 34 of constant cross section against the control flow toward the adjusting device 24.

The inch device having adjustable orifice 39 which is normally kept closed by means of spring 40 is through the linkage 41 and the receiving cylinder 42 as well as through the control conduit 43 in communication with the main brake cylinder 44 of the fork lift and may be actuated by the brake pedal 45 in such a way that through the intervention of the adjustable orifice 39 the control pressure is reduced in conduit 17 toward conduit 28. This change in the control pressure beings about that, depending on the control position of the driving direction valve 18, a change in the adjusting angle of the hydraulic adjusting pump 4 will be effected. The inch device can influence the adjusting speed of the adjusting pump 4 only within the region below the respective prevailing or effective adjustment setting of the four throttles of the double throttle valves 20 and 26. The damming-up pressure generated by the orifice 33 in the control conduit 17 is dependent on the motor speed of the drive motor 1 and thus on the delivery of the hydraulic pump 3 and by means of the pressure limiting valve 4a is set at a maximum pressure. The invention thus makes possible the automatic adaptation and limitation of the retardation and acceleration forces to the respective load condition of the fork lift. In other words, at any useful load, these forces are automatically, during the braking from forward drive and the starting to drive rearwardly, adapted to the respective prevailing dynamic driving stability of the fork lift. As a result thereof, the safety of the fork lift is improved while simultaneously the best possible loading and unloading output will be realized. During the starting in forward drive and during the braking operation while driving rearwardly, the maximum dynamic driving stability can be taken advantage of to the full extent and the driving condition can be influenced with relatively high forces.

As will be evident from the above, the advantages of the arrangement according to the present invention consist primarily in that for forward drive the driving output can be taken full advantage of because at the loaded fork lift during the rearward drive the driving output is automatically so controlled that an acceleration which is lower than the maximum possible acceleration becomes effective. As a result thereof, with the arrangement according to the invention it is not necessary, by a corresponding distribution of the weight onto the rear axle, to enable a higher acceleration so that also a reduction in the lateral standing stability will be avoided. Similarly, with the means according to the present invention, an increase in the dimensions and the weight proper of the fork lift will be avoided.

It is, of course, to be understood that the present invention is, by no means, limited to the specific showing in the drawings but also comprises any modifications within the scope of the appended claims.

What is claimed is:

1. In a control system for a fork lift truck having a fluid operable lift cylinder and a fluid drive motor and a variable delivery reversible pump connected to the motor and a drive engine connected to drive the pump; said pump having a control element movable from a first position of maximum pump delivery in forward direction through a position of zero pump delivery to a second position of maximum pump delivery in reverse direction, a fluid operable reversible actuator connected to said control element and normally biased toward a center position in which said control element is in zero delivery position, a second pump and a reversing valve having an inlet connected to said second pump and a respective output connected to each side of said actuator, a third pump and a control valve connecting the third pump to the lift cylinder, both of said second and third pumps being driven by the engine, control means for controlling the rate of movement of said actuator at least toward said second position thereof in response to the supply of actuating fluid thereto from said reversing valve.

2. A control system according to claim 1 in which said control means comprises first and second throttle valves connected in parallel between opposite sides of said actuator and the respective outlets of said reversing valve, and a check valve in series with each throttle valve permitting one-way flow only through said first throttle valves toward said actuator and through said second throttle valves away from said actuator.

3. A control system according to claim 2 in which said second throttlve valve through which fluid is expelled from said actuator when the control element is moving toward said second position is variable, and means operable in response to a supply of actuating fluid to said lift cylinder for increasing the degree of restriction of said variable second throttle valve.

4. A control system according to claim 2 in which said first throttle valve through which fluid flows to said actuator when said control element is moving toward said second position is variable, and means operable in response to a supply of actuating fluid to said lift cylinder for increasing the degree of restriction of said variable first throttle valve.

5. A control system according to claim 2 in which said second throttle valve through which fluid is expelled from said actuator when the control element is moving toward said second position is variable, and first throttle valve through which fluid flows to said actuator when said control element is moving toward said second position is also variable, and means operable in response to a supply of actuating fluid to said lift cylinder for increasing the degree of restriction of said variable first and second throttle valves.

6. A control system according to claim 5 in which the others of said throttle valves are in the form of fixed restrictions.

7. A control system according to claim 2 in which said reversing valve has a centered position in which the opposite sides of said actuator are interconnected.

8. A control system according to claim 2 which includes restrictor means between the discharge side of said second pump and exhaust, a brake pedal, and means operated by the brake pedal for decreasing the restriction of said restrictor means.

9. A control system according to claim 5 which includes a valve interposed between said lift cylinder and said variable throttle valves and adapted to open only at a minimum pressure at said lift cylinder.

* * * * *